US012044393B2

(12) United States Patent
Herold et al.

(10) Patent No.: US 12,044,393 B2
(45) Date of Patent: Jul. 23, 2024

(54) LIGHT SOURCE AND METHOD FOR OPERATING A LIGHT SOURCE

(71) Applicant: Excelitas Noblelight GmbH, Hanau (DE)

(72) Inventors: Marco Herold, Hanau (DE); Andreas Stahl, Frankfurt (DE)

(73) Assignee: Excelitas Noblelight GmbH, Hanau (DE)

( * ) Notice: Subject to any disclaimer, the term of this patent is extended or adjusted under 35 U.S.C. 154(b) by 0 days.

(21) Appl. No.: 17/906,951

(22) PCT Filed: Mar. 15, 2021

(86) PCT No.: PCT/EP2021/056491
§ 371 (c)(1),
(2) Date: Sep. 21, 2022

(87) PCT Pub. No.: WO2021/190971
PCT Pub. Date: Sep. 30, 2021

(65) Prior Publication Data

US 2023/0142332 A1 May 11, 2023

(30) Foreign Application Priority Data

Mar. 26, 2020 (DE) ..................... 10 2020 108 372.6

(51) Int. Cl.
*F21V 29/57* (2015.01)
*F21V 23/00* (2015.01)
(Continued)

(52) U.S. Cl.
CPC ............ *F21V 29/57* (2015.01); *F21V 23/003* (2013.01); *F21V 29/503* (2015.01); *H05B 47/28* (2020.01); *F21Y 2115/10* (2016.08)

(58) Field of Classification Search
CPC ...... F21V 29/57; F21V 29/503; F21V 23/003; H05B 47/28
See application file for complete search history.

(56) References Cited

U.S. PATENT DOCUMENTS

| | | | | |
|---|---|---|---|---|
| 8,754,589 B2 * | 6/2014 | Chemel ................ | H05B 47/155 315/307 |
| 8,841,859 B2 * | 9/2014 | Chemel ................ | H05B 47/155 315/307 |

(Continued)

FOREIGN PATENT DOCUMENTS

| | | |
|---|---|---|
| CN | 204962677 U | 1/2016 |
| CN | 106051650 A | 10/2016 |

(Continued)

OTHER PUBLICATIONS

Office Action dated Apr. 28, 2023 in CN Application No. 202180021273.2 (Machine translation attached).

*Primary Examiner* — Bryon T Gyllstrom
(74) *Attorney, Agent, or Firm* — Wolf, Greenfield & Sacks, P.C.

(57) ABSTRACT

A light source comprises at least one light-emitting component, in particular a component emitting ultraviolet light and/or a semiconductor component, and a line system, through which a cooling fluid can flow in a flow direction, for controlling the temperature of the at least one light-emitting component, and also a first and a second cooling-fluid pressure sensor, which are arranged one after the other in the line system in the flow direction, and an electronics unit which is connected to the first and second cooling-fluid pressure sensors and configured to determine at least one diagnostic, control and/or regulating value on the basis of pressures captured by the first cooling-fluid pressure sensor and by the second cooling-fluid pressure sensor.

7 Claims, 2 Drawing Sheets

Figure 1:
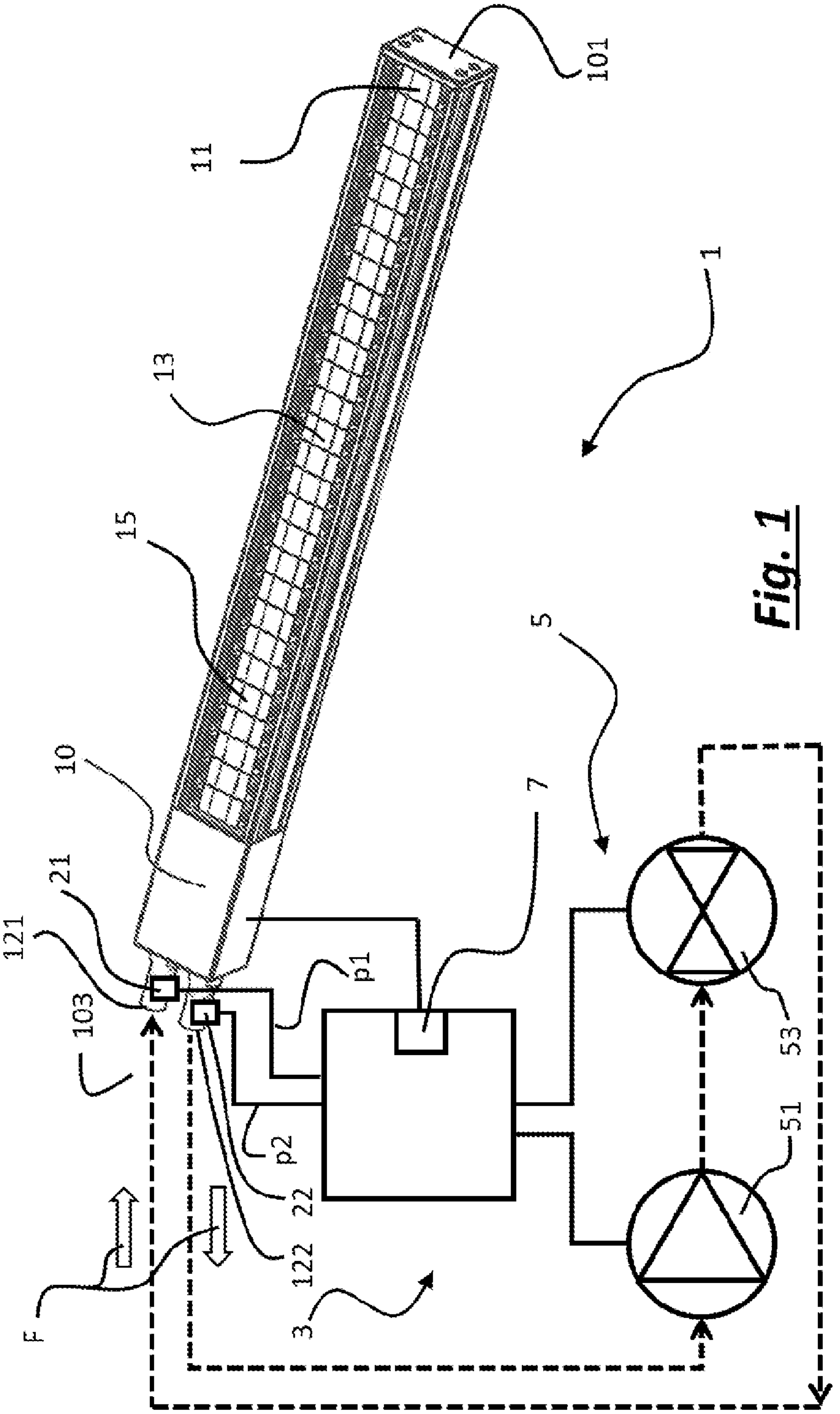

(51) Int. Cl.

| | |
|---|---|
| ***F21V 29/503*** | (2015.01) |
| ***F21Y 115/10*** | (2016.01) |
| ***H05B 47/28*** | (2020.01) |

(56) References Cited

U.S. PATENT DOCUMENTS

| | | | | |
|---|---|---|---|---|
| 8,851,154 | B2 * | 10/2014 | Cheng | F21V 29/56 62/118 |
| 2006/0221606 | A1 * | 10/2006 | Dowling | F21S 4/20 362/217.08 |
| 2010/0196622 | A1 | 8/2010 | Van Pul et al. | |
| 2016/0209019 | A1 * | 7/2016 | Johnson, III | B41F 23/044 |
| 2017/0241632 | A1 * | 8/2017 | Nguyen | F21V 29/59 |

FOREIGN PATENT DOCUMENTS

| | | | |
|---|---|---|---|
| DE | 102006016529 | A1 | 10/2007 |
| JP | 2011502031 | A | 1/2011 |
| JP | 2011150862 | A | 8/2011 |
| JP | 2019120756 | A | 7/2019 |
| WO | 2009035238 | A2 | 3/2009 |
| WO | 2014064904 | A1 | 5/2014 |
| WO | 2016115299 | A1 | 7/2016 |

* cited by examiner

LIGHT SOURCE AND METHOD FOR OPERATING A LIGHT SOURCE

CROSS-REFERENCE TO RELATED APPLICATIONS

This application is a National Stage filing under 35 U.S.C. § 371 of International Application Serial No. PCT/EP2021/056491, filed Mar. 15, 2021, which claims the benefit of priority to German patent application number 102020108372.6, filed Mar. 26, 2020.

The invention relates to a light source and to a method for operating a light source. A light source comprises at least one light-emitting component, in particular a component emitting ultraviolet light and/or a semiconductor component, and also a line system through which a cooling fluid can flow in a flow direction for controlling the temperature of the at least one light-emitting component.

WO 2016/115299 A1 discloses an intelligent distributor system for a light source, a light source with an intelligent distributor system, and associated operating methods. The intelligent distributor system is provided with at least one sensor for capturing a characteristic variable of the cooling fluid within the distributor system and with a microprocessor which processes the sensor data. The intelligent sensor arrangement may capture, for example, an input flow rate of the cooling fluid, an output flow rate of the cooling fluid, the pH value of the cooling fluid, a pressure of the cooling fluid, an inlet temperature of the cooling fluid, an outlet temperature of the cooling fluid, an ambient temperature of the system or the like. On the basis of the captured variable, the cooling-fluid flow can be regulated, for example, in order to control the temperature of the lamp system or to optimally control a switch-on process. For this purpose, WO 2016/115299 A1 proposes in particular the use of temperature and flow sensors at the inlet and at the outlet of the distributor. In addition, WO 2016/115299 A1 proposes carrying out leakage detection on the basis of the measurement of a pressure in the distributor system. The use of various sensors for different variables of the cooling fluid permits precise recognition of various system states and has therefore proven to be outstandingly suitable for carrying out precise regulation of the temperature control of lamp systems. For some applications, there is a desire for an alternative solution for a light source and an associated operating method, which does not necessarily have to ensure high-precision regulation but enables with simple and/or cost-effective means the most efficient and safest operation possible. In particular, the use of movable parts susceptible to faults, such as springs, valves and/or measuring forks, is to be dispensed with. This object is achieved by the subject-matter of claim 1.

Accordingly, a light source is provided which comprises at least one light-emitting component and a line system through which cooling fluid can flow in a flow direction for controlling the temperature of the at least one light-emitting component. The light-emitting component can in particular be a component emitting ultraviolet light. Alternatively or additionally, the light-emitting component can be a semiconductor component.

According to the invention, the light source comprises a first cooling-fluid pressure sensor and a second cooling-fluid pressure sensor. The first cooling-fluid pressure sensor and the second cooling-fluid pressure sensor are arranged in the line system one after the other in the flow direction. The first cooling-fluid pressure sensor and the second cooling-fluid pressure sensor are arranged at different points in the line system. Such a measurement set-up can be realized in a particularly simple and cost-effective manner. Retrofitting of existing light sources is simple to implement. The measurement set-up is suitable for tolerating different, in particular varying, for example, fluctuating, pump outputs. The measurement set-up has a low dependence on the length of the lines between the light source, in particular the distributor block thereof, and the pump or the like.

The light source according to the invention further comprises an electronics unit which is connected to the first cooling-fluid pressure sensor and to the second cooling-fluid pressure sensor. The connections of the electronics unit to the cooling-fluid pressure sensors are an electrical, in particular a data-transmitting connection which can be designed for the transmission of analog and/or digital data. The electronics unit is configured to determine at least one diagnostic, control and/or regulating value on the basis of pressures captured by the first cooling-fluid pressure sensor and by the second cooling-fluid pressure sensor.

The electronics unit can in particular be configured to form a difference value on the basis of the pressures captured by the first cooling-fluid pressure sensor and the second cooling-fluid pressure sensor. For example, the electronics unit can be configured to determine a pressure difference between the first cooling-fluid pressure captured by the first pressure sensor and the second cooling-fluid pressure captured by the second cooling-fluid pressure sensor. Alternatively or additionally, the electronics unit can be configured to capture electrical, in particular digital and/or analog, measurement signals relating to the first cooling-fluid pressure at the first cooling-fluid pressure sensor and to the second cooling-fluid pressure at the second cooling-fluid pressure sensor and to form a difference in relation to the measurement values from the first cooling-fluid pressure sensor and the second cooling-fluid pressure sensor. Depending on the measurement signals from the cooling-fluid pressure sensors, i.e., the first cooling-fluid pressure sensor and the second cooling-fluid pressure sensor, and also optionally further cooling-fluid pressure sensors, and/or possible further other sensors, the electronics unit can determine a diagnostic, control and/or regulating value.

A diagnostic value can, for example, be a warning message, a status message or an error message. The output of a diagnostic value, in particular an error message or a warning message, can take place on a dedicated data transmission path, in particular a dedicated data transmission line, exclusively for error and/or warning messages. The electronics unit can, for example, be configured to generate an error message when the first pressure and the second pressure are the same. The electronics unit can, for example, be configured to generate a warning message that the pressure difference between the first pressure and the second pressure is outside a predetermined permissible pressure difference range. The electronics unit can be configured to initiate an emergency shutdown of the light source in response to an error message. The thermal capacity of the components acting as heat exchangers, such as the distributor block and/or the carrier elements, which are made of a metal, such as aluminum, copper or the like, offers sufficient protection against an abrupt rise in temperature of the light-emitting components until the power control reacts.

The electronics unit can in particular be configured to output as a diagnostic value a status message indicating the presence of a lowest required flow rate or a smallest required difference for operating the light source between the first and the wide cooling-fluid pressure or pressure value. For example, the electronics unit can be configured to output a status message in the absence of which an activation of the light-emitting components does not take place. As long as the actual difference between the first pressure and the second pressure is less than the smallest required difference, the electronics unit causes the at least one light-emitting component not to be operated. In this way, it can be ensured that a minimum flow in the line system prevails independently of other parameters in order to even start the at least one light-emitting component.

A control and/or regulating value can, for example, be a control value for actuating a cooling-fluid actuator, such as a pump, a control valve or the like, in order to influence a flow rate of the cooling fluid in the line system.

A diagnosis, control and/or regulation for effective and safe operation of a light source can be achieved in a particularly simple manner on the basis of cooling-fluid pressures captured at different points in the line system. For example, a difference in pressures or pressure measurement values can be used to easily detect whether the flow rate of cooling fluid in the line system corresponds to a desired flow rate or deviates significantly therefrom, so that corresponding corrective and/or emergency measures can be performed.

According to one embodiment of the light source, the cooling-fluid line system comprises a distributor block with a cooling-fluid inlet opening and a cooling-fluid return opening. The distributor block comprises a first cavity and a further cavity, which are in fluid-conducting connection with one another by means of at least one fluid path. The first cavity forms the cooling-fluid inlet opening. The second cavity forms the cooling-fluid return opening. For example, the first cavity and the further cavity can be in connected by means of a number of fluid paths, which number is equal to, at least equal to, greater than, in particular corresponding to twice, the number of light-emitting components of the light source. The first cooling-fluid pressure sensor is arranged in the first cavity and the second cooling-fluid pressure sensor is arranged in the second cavity. In such an arrangement, the pressure loss between the first cavity and the second cavity produced by the at least one fluid path can be decisive for a pressure difference. In particular, the line system is designed in such a way that the flow of the cooling fluid takes place in the flow direction from the cooling-fluid inlet opening of the distributor block through the first cavity, subsequently through the at least one fluid path, afterwards through the second cavity and then through the cooling-fluid return opening. It can be preferred that the cooling fluid in the line system flows from the first cavity to the further or second cavity exclusively along one fluid path or a plurality of fluid paths in the flow direction.

The at least one fluid path and/or the plurality of fluid paths between the first cavity and the further cavity can determine the pressure difference in the cooling fluid between the first pressure sensor and the second pressure sensor. In particular, the pressure difference from the first pressure sensor to the second pressure sensor can be determined to be at least 90%, in particular at least 95%, preferably at least 99%, due to the pressure loss as a result of the flow through the at least one fluid path or the plurality of fluid paths. In particular, the cooling-fluid pressure within the first cavity may be constant or substantially constant. In particular, the cooling-fluid pressure in the second or further cavity may be substantially constant or constant. A substantially constant cooling-fluid pressure within the first cavity or within the second cavity can be present when the cooling-fluid pressure at the cooling-fluid inlet or return opening relative to the cooling-fluid pressure at the point furthest away from the opening within the first or second cavity differs by less than 10%, in particular by less than 5%, preferably by less than 1%.

It may be preferred that the flow cross-section of the first cavity and the flow cross-section of the second cavity is significantly larger than the smallest flow cross-section of the at least one fluid path. For example, the fluid path can have a smallest cross-section that is decisive for the pressure loss, for example in the form of a capillary channel, a branch hole or a branch channel or the like. The relevant cross-section of the fluid path can be at least 10 times, at least 20 times, at least 50 times or at least 100 times smaller than the flow cross-section of the first cavity and/or of the second cavity. The flow cross-section of the first cavity may be substantially equal to the flow cross-section of the second cavity. The flow cross-section of the first cavity and the flow cross-section of the second cavity can differ from one another by a factor of at most 5, in particular at most 2, preferably at most 1.5, particularly preferably at most 1.1.

According to a development of the light source, the first cooling-fluid pressure sensor can be arranged at the cooling-fluid inlet opening. Alternatively or additionally, the second cooling-fluid pressure sensor can be arranged at the cooling-fluid return opening. Alternatively or additionally, the first pressure sensor can be arranged at the end of the distributor block opposite the cooling-fluid inlet opening or at a point located furthest away from the cooling-fluid inlet opening within the first cavity. Alternatively or additionally, the second pressure sensor can be arranged at the end of the distributor block opposite the cooling-fluid return opening or at a point located furthest away from the cooling-fluid return opening within the second cavity.

The cooling-fluid line system can at least comprise one first carrier element that the at least one fluid path at least in sections out. The at least one first light-emitting semiconductor component is fastened to the first carrier element. In particular, the light source can comprise a number of carrier elements corresponding to the number of light-emitting components. The number of carrier elements is preferably equal to the number of light-emitting components. The at least one carrier element can be detachably or non-detachably fastened to the distributor block. For example, a carrier element can be detachably screwed onto the distributor block. It is conceivable for a carrier element to be non-detachably soldered, welded and/or riveted to the distributor block.

The fluid path between the first cavity and the second cavity is preferably realized by a first branch channel in the distributor block, a through-passage section in the carrier element and a second branch section in the distributor block. In particular, the at least one first branch channel can extend from the first cavity to the carrier element. In particular, the at least one second branch channel can extend from the at least one carrier element to the further cavity. In particular, the fluid path can consist of an at least one first branch channel, at least one through-passage section and at least one second branch channel. A fluid path can consist of exactly one, exactly two or more first branch channels in the distributor block, exactly one, exactly two or more second branch channels in the distributor block and exactly one, exactly two or more through-passage sections in the carrier element. Each individual carrier element of a light source can form exactly one through-passage section, exactly two through-passage sections or several through-passage sections. The through-passage section in the carrier element can be formed by one or more heat-exchanger channels, in particular formed in the carrier element. A light source comprising a plurality of carrier elements may be equipped with a number of first branch channels for each individual carrier element in the distributor block, said number being exactly equal to or twice the number of carrier elements or at least as large as the number of carrier elements. A light source comprising a plurality of carrier elements may be equipped with a number of second branch channels for each individual carrier element in the distributor block, said number being exactly equal to or twice the number of carrier elements or at least as large as the number of carrier elements. The numbers of first branch channels and of second branch channels are in particular equal.

According to one embodiment of a light source, the first cooling-fluid pressure sensor and/or the second cooling-fluid pressure sensor captures a pressure measurement value of the cooling fluid and provides the electronics unit with a corresponding electrical, in particular digital and/or analog, pressure measurement signal. The first cooling-fluid pressure sensor provides a first electrical pressure measurement signal. The second cooling-fluid pressure sensor provides a second electrical pressure measurement signal. The pressure measurement signal can preferably correspond to the pressure measurement value in such a way that the pressure measurement signal is a current or voltage signal that is proportional to the pressure measurement value. The pressure measurement signal of the cooling-fluid pressure sensor can preferably correspond to the pressure measurement value in such a way that a constant proportionality factor can be defined that, multiplied by the measured cooling-fluid pressure or pressure measurement value, yields the respective pressure measurement signal (in particular voltage signal or current signal). The electronics unit can comprise at least one analog-to-digital converter in order to convert a current signal or a voltage signal into a digital signal. The electronics unit can comprise a microcontroller and/or microprocessor, which can process an in particular analog-to-digital-converted pressure measurement signal, in particular a current or voltage signal.

According to one embodiment of a light source, the electronics unit has a flow control and/or regulation device which is configured to define a flow rate of the cooling fluid in the flow direction through the line system. The flow of the cooling fluid can be defined, for example, as a flow rate, for example as a volumetric flow (e.g., in L/min or $m^3/s$). For example, in the case of a light source of predetermined maximum output power, a desired flow rate of the cooling fluid for controlling the temperature of the light source, in particular of the at least one light-emitting component, can be defined in such a way that at maximum nominal power of the at least one light-emitting component, the flow is at least so great that overheating of the light-emitting component is prevented. For example, depending on the light output of the at least one light-emitting component and the corresponding power loss or heat output of the light source, the flow can be adjusted as a function of the light-source-specific cooling-fluid temperature at the cooling-fluid inlet opening of the cooling-fluid flow.

In particular, the carrier element can be cooled with a cooling power for dissipating the heat output of the light-emitting component in a range of 100 to 5000 W, preferably 100 to 3000 W, more preferably 200 to 2000 W. For example, the carrier element can be cooled with a cooling power for dissipating the heat output of the light-emitting component in a range of 100 to 1000 W, preferably 100 to 500 W, more preferably 200 to 400 W. Alternatively, the carrier element can be cooled with a cooling power for dissipating the heat output of the light-emitting component in a range of 500 to 5000 W, preferably 1000 to 3000 W, more preferably 1500 to 2000 W. If the light source contains at least one further carrier element, each further carrier element is preferably cooled with a cooling power falling within one of the above ranges.

For example, a flow control device can comprise a pump for conveying the cooling fluid according to a flow rate greater than or equal to the desired flow rate. Alternatively or additionally, a flow control device can be a restrictor and/or a valve, in particular a balancing valve, for example a so-called TacoSetter valve, as described, for example, in DE 20 2013 001 744 U1, in order to set an in particular maximum desired flow rate. In particular, a flow control device can comprise a pump which is configured to convey cooling fluid through the line system according to its maximum nominal pump outputs, and a restrictor and/or a valve, in particular a balancing valve, which sets the flow rate in the line system according to a desired flow rate, in particular limits a highest possible flow rate.

According to a development, the electronics unit comprises a flow control and/or regulation device which has a pump with a delivery rate for conveying the cooling fluid through the line system. The flow control and/or regulation device is configured to adjust the delivery rate of the pump taking into account a desired temperature control of the light-emitting component for a lowest desired cooling-fluid flow rate. In particular, the flow control and/or regulation device is configured to adjust the lowest desired cooling-fluid flow rate as a function of a diagnostic, control and/or regulating value. For example, the flow control and/or regulation device can be configured to adjust the pump with a delivery rate equal to or less than its nominal maximum pump output, wherein in particular the flow control and/or regulation device can be configured to adjust the delivery rate on the basis of a diagnostic, control and/or regulating value of the electronics unit, in particular so that the temperature control of the at least one light-emitting component corresponds to a desired temperature control. For example, the flow control and/or regulation device can control at least one fluid actuator, such as a pump, a restrictor or a valve, in that a measurement value and/or a diagnostic, control and/or regulating value an actual value is compared to a desired value related to the desired temperature control, in order to define a setting value for the actuator. For example, the flow control and/or regulation device can communicate with the electronics unit in a signal-transmitting manner or be formed in functional union.

According to one embodiment of the light source, the electronics unit comprises at least one power electronics unit for adjusting the light output of the at least one light-emitting component or of the plurality of light-emitting components, wherein the electronics unit is configured to determine the at least one diagnostic, control and/or regulating value on the basis of the light output. Alternatively or additionally, the flow control and/or regulation device can be configured to define the flow rate of the cooling fluid through the line system on the basis of the light output. A power electronics unit can be provided in particular in the case of a light source with one or more light-emitting semiconductor components. The power electronics unit can adjust the light output of the at least one light-emitting component to its maximum nominal light output or to a lower light output, wherein a light output lower than the maximum nominal light output corresponds to a dimmed light output. It is clear that the power loss or heat output correlates with the light output set. In the case of a light source which is operated with a dimmed light output, only a reduced flow rate of cooling fluid may in some circumstances be required to achieve a desired temperature control of the at least one light-emitting component. The power electronics unit and the flow control and/or regulation device can be coordinated with one another in such a way that, in the case of a dimmed light output, a corresponding reduction of the cooling-fluid flow rate is defined, or vice versa. In the case of a dimmed light output and/or a reduced flow rate, the electronics unit can be configured to take into account the dimmed light output and/or the reduced flow rate in the determination of the diagnostic, control and/or regulating value. The electronics unit can take into account, for example, that, with a reduced flow rate, a corresponding reduced pressure difference between the first cooling-fluid pressure and the second cooling-fluid pressure is to be expected. For example, in the case of a dimmed light output, for determining the diagnostic control and/or regulating value, the electronics unit can tolerate other, in particular larger deviations from a desired pressure difference. For example, the electronics unit can be configured such that, in the case of a predetermined proportionally dimmed light output, a permissible maximum difference, changed by a tolerance factor corresponding to the predetermined proportion, between the first cooling-fluid pressure and second cooling-fluid pressure is tolerated, without a diagnostic value, such as a warning message or an error message, being generated and/or control values or regulating values adapted to the tolerance factor being generated.

The electronics unit can be configured to adapt, depending on a set light output, a pressure threshold value, such as a minimum threshold value and/or a maximum threshold value, in a manner corresponding to an in particular dimmed setting of the light output. The electronics unit and the power electronics unit can be coupled to one another in a signal-transmitting manner or can be formed in functional union. The power electronics unit and the flow control and/or regulation device can be connected to one another in a signal-transmitting manner or can be formed in functional union. Electronics unit, flow control and/or regulation device and power electronics unit can be coupled to one another in a signal-transmitting manner or can be formed in functional union.

The invention also relates to a method for operating a light source. The method is intended for operating a light source which comprises at least one light-emitting component, in particular a component emitting ultraviolet light or a semiconductor component, wherein the at least one light-emitting component is temperature-controlled by means of a cooling fluid, wherein the cooling fluid is conveyed through a line system. The light source can in particular be designed as described above.

According to the invention, at least a first pressure of the cooling fluid is captured at a first point in the line system and a second pressure of the cooling fluid is captured at a second point in the line system. According to the operating method according to the invention, a diagnostic, control and/or regulating value is determined on the basis of the first pressure and the second pressure. For example, using the known characteristic values of the light source and its line system, an actual cooling-fluid flow rate in the line system can be determined by calculation on the basis of the first pressure and the second pressure.

According to one embodiment, the method for operating a light source comprises a flow of the cooling fluid in the flow direction through the line system being defined. In particular, taking into account a desired temperature control of the light-emitting component, a lowest desired cooling-fluid flow rate can be set. The desired cooling-fluid flow rate can be configured in such a way that the flow rate of the cooling fluid through the line system is defined such that a flow rate is provided that is not more than adequate, which flow rate is required to prevent a maximum desired temperature control, in particular a maximum temperature, of the light-emitting component from being exceeded. For example, a light source can be operated by operating a pump with a delivery rate which is at least as great as or greater than the delivery rate required to ensure at least the adequate flow rate in the flow direction through the line system. Alternatively or additionally, a maximum nominal delivery rate of the pump can be set, wherein in particular a restrictor, a valve, for example a control valve, a balancing valve or the like, is set in such a way that the flow rate of the cooling fluid through the line system is set as low as possible in order to still ensure the desired temperature control of the at least one light-emitting component that of the light source.

According to one embodiment of a method for operating a light source, which can be combined with the previous ones, a diagnostic value, in particular a status message, a warning message or an error message, is output when the first pressure and the second pressure are equal or substantially equal. A substantially equal pressure can be present when the difference between the first pressure and the second pressure is no greater than 0.5 bar, in particular no greater than 0.25 bar, preferably no greater than 0.1 bar. If the first pressure and the second pressure are equal or substantially equal, an error message can be output indicating that there is no flow or that the flow rate is critical, too low. It is clear to the person skilled in the art that the difference between a first pressure and a second pressure, which are captured at different points in a line system, correlates with the flow rate in the line system so that in the case of a critically low or non-existent difference between the first pressure and the second pressure, conclusions can be drawn regarding a vanishing or non-existing actual flow rate.

It is conceivable, in the method for operating a light source, for the at least one light-emitting component, in particular the entire light source, to be switched off in response to the output of a diagnostic value, in particular an error value or a status message. The diagnostic value may be output in response to it being determined on the basis of the first pressure and the second pressure that the pressure difference is too small. When a predetermined diagnostic value, such as an error value or error signal, is received, the operating method can initiate an emergency shutdown of the light-emitting components in order to prevent or at least reduce the risk of damage, in particular irreparable damage, to one or more light-emitting components.

According to one embodiment of a method for operating a light source, which can be combined with the previous ones, a diagnostic value can be output, in particular a warning message or a warning value, when a difference between the first pressure and the second pressure falls below a minimum threshold value and/or exceeds a maximum threshold value. The method for operating a light source can comprise prespecifying a minimum threshold value relating to the specific light source and/or a maximum threshold value relating to the specific light source for a permissible difference between the first or second pressures, in particular a pressure difference or a pressure measurement value difference. The maximum threshold value and/or the minimum threshold value can be specified by means of a calibration routine or on the basis of calculated theoretical values or on the basis of table values or the like. In the method for operating the light source, it is possible, in particular by means of an electronics unit, to check whether the difference is greater than a maximum threshold value and/or to check whether the difference is less than a minimum threshold value. If the difference is less than the minimum or minimum threshold value and/or if the difference is greater than the maximum threshold value, a diagnostic value can be output in particular by the electronics unit. For example, a warning message can be output as a diagnostic value in order to initiate measures that cause the first pressure and/or the second pressure to change in such a way that the difference becomes (once again) less than the maximum threshold value or greater than the minimum threshold value. For example, when the minimum threshold value is undershot, a diagnostic value or control value can be output which, for example, causes an increase in the delivery rate of a pump in order to increase the flow rate and the difference between the first and second pressures correlating therewith.

Alternatively or additionally, a warning message can be output to initiate manual intervention, such as maintenance work or the like. It is conceivable that when an in particular second minimum threshold value is undershot, a diagnostic value, such as a warning message or an error message, is output, which initiates measures in response to leakage in the line system. For example, a desired difference can be predetermined, in particular as a function of a light output and/or a desired flow rate, wherein in the case of a deviation of the actual difference between the first pressure currently captured by the first pressure sensor and first pressure currently captured by the first pressure sensor in relation to the desired difference, a deviation of ±30% or more, in particular ±50% or more, preferably ±75% or more, is present. Relative to a desired difference set in particular as a function of a light output and/or a desired flow rate, the minimum threshold value can be, for example, 75% of the desired difference, 50% of the desired difference or 30% of the desired difference or less. Relative to a desired difference set in particular as a function of a light output and/or a desired flow rate, the maximum threshold value can be, for example, 130%, 150%, 200% or more of the desired difference.

According to one embodiment of a method for operating a light source that can be combined with the previous ones, the light output of the at least one light-emitting component can be set. In particular, the light output of various light-emitting components can preferably be set differently, wherein the diagnostic, control and/or regulating value is determined on the basis of the light output or light outputs. Alternatively or additionally, a flow rate, in particular the desired flow rate, can be set on the basis of the light output. For example, the light output of the at least one light-emitting component can be reduced or dimmed, which in particular by means of the electronics unit to adjust, by an adapted adjustment, the diagnostic, control and/or regulating value on the basis of the light output.

It is clear that the light source according to the invention can be configured to be operated according to the method according to the invention. It is clear that the method according to the invention can be carried out with the previously described light source and also, if applicable, its above-described, in particular optional, components. It is clear that the method according to the invention can be carried out for operating an above-described light source.

The invention can optionally be realized in a printing machine which comprises a light source according to the invention. Considered for this purpose is any kind of printing machine that is suitable for the use of the light source according to the invention. A preferred printing machine is designed to carry out the method according to the invention.

In one embodiment of the printing machine, the light source can be arranged and formed in the printing machine to irradiate a composition printed on a printing substrate. Optionally, the printing machine may be configured to process a composition, wherein the composition is a printing ink or a paint or both.

A printing machine, in particular one without a print-image memory, can be designed for non-impact printing (NIP). A preferred printing machine with no print-image memory is an inkjet printer or a laser printer or both.

In an alternative embodiment, the printing machine has a print-image memory. A preferred print-image memory is a printing roller or a printing plate.

The printing machine can be arranged and designed for indirect printing by means of the print-image memory. A preferred printing machine for indirect printing is an offset printing machine. A preferred offset printing machine is a sheet-fed offset printing machine.

Light Source

In the context of the invention, any device that is designed for emitting electromagnetic radiation and seems suitable to the person skilled in the art for use according to the invention, preferably for use in a printing machine, can be considered as a light source. In addition to visible light, the term "electromagnetic radiation" also includes components of the electromagnetic spectrum that are not visible to the human eye. Preferred electromagnetic radiation falls within the wavelength range of 10 nm to 1 mm. Further preferred electromagnetic radiation is infrared radiation (IR radiation) or ultraviolet radiation (UV radiation) or a mixture of both. According to the DIN 5031-7 standard, the wavelength range of UV radiation extends from 10 to 380 nm. Here, UV-A radiation by definition falls within the range of 315 to 380 nm, UV-B radiation within the range of 280 to 315 nm, UV-C radiation within the range of 100 to 280 nm, and EUV radiation within the range of 10 to 121 nm. In the context of the invention, UV radiation, selected from the group consisting of UV-A radiation, UV-B radiation, and UV-C radiation, or a combination of at least two thereof, is particularly preferred. In this case, it must be taken into account that although the aforementioned standard defines the wavelength ranges of UV radiation, in the technical field of LEDs, which are light-emitting semiconductor components preferred in the context of the invention as described below, LEDs with maxima of the emitted intensity (also referred to in the technical field as peak wavelength) at wavelengths that do not fall within the wavelength ranges indicated in the standard are also referred to as UV LEDs. For example, LEDS with maxima of the radiated intensity at wavelengths of 385 nm, 395 nm and 405 nm are also referred to as UV-A LEDs. Within the scope of the invention, such LEDs are also among the preferred light-emitting semiconductor components. Furthermore, the terminology of the technical field is adopted here and such LEDs are also referred to as UV LEDs. A preferred light source contains an LED module or is an LED module. An LED module preferably contains a printed circuit board on which a plurality of LEDs is arranged. The LEDs can here each be equipped with an optical system. In addition, an optical system can also be assigned to a plurality of LEDs. An optical system is herein an element which is arranged and designed for the manipulation of electromagnetic radiation. Here, both optical parts and optical components are possible. A preferred optical system is one selected from the group consisting of a transmission optical system, a conversion optical system, and a reflection optical system, or a combination of at least two thereof. A transmission optical system is an optical system that is traversed by electromagnetic radiation for the manipulation thereof. A preferred transmission optical system is a lens or a transmission grating. A conversion optical system is an optical system that is arranged and designed for changing a wavelength of electromagnetic radiation. In the case of an LED, this can preferably be used for adjusting a color of the light emitted by the LED. A preferred conversion optical system is a conversion layer, i.e., a layer containing at least one fluorescent dye. A reflection optical system is an optical system which reflects electromagnetic radiation in order to manipulate the electromagnetic radiation, in particular a direction of propagation of the electromagnetic radiation. A preferred reflection optical system is a mirror or a reflection grating. The light source further preferably contains a ballast which is arranged and designed for operating the LED module. A preferred ballast is an LED driver.

Light-Emitting Semiconductor Device

Suitable as a light-emitting semiconductor device is any component that contains a semiconductor and seems suitable to the person skilled in the art as light-emitting component of the light source according to the invention. Light-emitting semiconductor components include in particular light-emitting diodes (LEDs) and laser diodes (also called semiconductor lasers), wherein light-emitting diodes are particularly preferred here. A particularly preferred LED is an IR LED or a UV LED or both. A preferred UV LED is one selected from the group consisting of a UV-A LED, a UV-B LED, and a UV-C LED, or a combination of at least two thereof.

Carrier Element

Any component that seems suitable to the person skilled in the art for use in a light source according to the invention is suitable as the carrier element. A preferred carrier element is plate-shaped, i.e., formed as a carrier plate. A particularly preferred carrier element is a cooling plate.

A sheet-like element whose thickness is less at every point than in each case its length and width by at least a factor of 2, more preferably at least 5, is referred to herein as a plate. The carrier element preferably consists of at least 80 wt. %, more preferably at least 90 wt. %, even more preferably at least 95 wt. %, of a material having a thermal conductivity of at least 50 W/(m·K), more preferably at least 100 W/(m·K), even more preferably at least 200 W/(m·K), most preferably at least 230 W/(m·K). The carrier element preferably contains at least 80 wt. %, more preferably at least 90 wt. %, even more preferably at least 95 wt. %, of a metal. A preferred metal is copper or aluminum or an alloy containing one or both of the aforementioned metals. In a preferred embodiment, the aforementioned material forms a base body of the carrier element, which can also have one or more coatings. A preferred coating consists of a metal selected from the group consisting of nickel, palladium, and gold, or of an alloy containing at least one of the aforementioned metals. If the carrier element contains a plurality of coatings, the latter preferably overlay the base body from the base body to the outside in the aforementioned order. Here, the layer sequences of base body, nickel coating, gold coating and also base body, nickel coating, palladium coating, gold coating are particularly preferred. The carrier element has the aforementioned coatings particularly preferably at least on the side of its carrier surface. The elements referred to herein as a carrier element are preferably not a substrate or a printed circuit board of an LED or of an LED module. Instead, the carrier element is preferably a component on whose carrier surface a plurality of LEDs or an LED module can be arranged. The carrier surface of a carrier element is preferably designed to be largely flat.

Distributor Block

In principle, any component that seems suitable to the person skilled in the art for 20 use according to the invention is suitable as a distributor block. The distributor block preferably serves as a distributor for a cooling fluid and as a component which carries the first carrier element and any further carrier elements of the light source according to the invention. For this purpose, the distributor block preferably has electrical connections and also connections for an inlet and a return of a cooling fluid. The aforementioned connections are preferably located on one or both end faces of the distributor block. Furthermore, the distributor block preferably contains an inlet and a return for a cooling fluid.

Cooling Fluid

Any fluid that seems suitable to the person skilled in the art within the scope of the invention, in particular for cooling the light source according to the invention, is suitable as cooling fluid. In this context, a fluid is a flowable medium. These include in particular gases and liquids. In this context, a cooling liquid is preferred as cooling fluid. A preferred cooling liquid includes water or glycol or a mixture of both. The cooling liquid preferably consists of water or a water-glycol mixture.

Printing Substrate

Any object that seems suitable to the person skilled in the art within the scope of the invention comes into consideration as the printing substrate, also called printing material. A preferred printing substrate is of sheet-like design. This means that a length and a width of the printing substrate is greater than a thickness of the printing substrate by a factor of at least 10, more preferably at least 100, even more preferably at least 1000. A preferred sheet-like printing substrate has a web-shaped design. This means that a length of the printing substrate is greater than a width of the printing substrate by a factor of at least 2, more preferably at least 5, even more preferably at least 10, most preferably at least 100. A preferred printing substrate contains, preferably consists of, paper, a film or a laminate. A preferred laminate contains one or more polymer layers, one or more paper layers, one or more metal layers, or a combination of the aforementioned layers in a layer sequence.

Printing Ink

Printing inks are colorant-containing mixtures which have a suitable viscosity for application as a thin layer. In this case, the thin layer in the hardened state preferably has a thickness (dry thickness) in a range of 0.5 to 50 μm, preferably 1 to 30 μm, more preferably 1 to 20 μm. A preferred printing ink contains one selected from the group consisting of one or more colorants, a binder, a vehicle, and an additive, or a combination of at least two, preferably all, of the foregoing. A preferred binder here is a resin or a polymer or a 20 mixture of both. A preferred vehicle is a solvent. A preferred additive is used to set a desired property of the printing ink, preferably a desired processing property, for example a viscosity of the printing ink. A preferred additive is one selected from the group consisting of a dispersing additive, a defoamer, a wax, a lubricant, and a substrate wetting agent, or a combination of at least two thereof. A preferred printing ink is further one selected from the group consisting of a toner, an ink for an inkjet printer, an offset printing ink, an illustration printing ink, a liquid colorant, and a radiation-curing printing ink, or a combination of at least two thereof. A preferred offset printing ink is a web offset printing ink or a sheet offset printing ink or both. A preferred web offset printing ink is a web offset cold-set printing ink or a web offset heat-set printing ink or both. A preferred liquid colorant is a water-based liquid colorant or a solvent-based liquid colorant or both. A particularly preferred printing ink contains 8 to 15 wt. % of at least one colorant, preferably at least one pigment, and in total 25 to 40 wt. % of at least one resin or at least one polymer or a mixture of the two, 30 to 45 wt. % of at least one high-boiling mineral oil (boiling range 250 to 210° C.), and in total 2 to 8 wt. % of at least one additive, in each case based on the weight of the printing ink.

Paint

A paint is a liquid or powdery coating material which has a suitable viscosity for application as a thin layer and from which a solid, preferably cohesive, film can be obtained by curing. Paints often contain at least one selected from the group consisting of at least one binder, at least one filler, at least one vehicle, at least one colorant, at least one resin and/or at least one acrylate, and at least one additive, or a combination of at least two thereof, wherein a combination of all aforementioned constituents (with resin and/or acrylate) is preferred. A preferred additive here is a biocide. A preferred biocide is an in-can preservative. Paints often serve to protect the object provided therewith, for decoration, functionalization of a surface of the object, for example a change of electrical properties or of wear resistance, or a combination of the aforementioned functions. A paint preferred within the scope of the invention is one selected from the group consisting of a water-based paint, a solvent-based paint, a UV-based, i.e., UV-curable, paint, and a dispersion paint, or a combination of at least two thereof. A particularly preferred paint is designed to protect a printed surface.

Colorant

Suitable colorants are both solid and liquid colorants known to the person skilled in the art and suitable for the present invention. According to DIN 55943:2001-10, the term "colorants" is the collective term for all coloring substances, in particular for dyes and pigments. A preferred colorant is a pigment. A preferred pigment is an organic pigment. Pigments to be considered in the context of the invention are in particular those pigments mentioned in DIN 55943:2001-10 and those mentioned in "Industrial Organic Pigments, 3rd edition." (Willy Herbus, Klaus Hunger, copyright © 2004 WILEY-VCH Verlag GmbH & Co. KGaA, Weinheim, ISBN: 3-527-30576-9). A pigment is a colorant, which is preferably insoluble in the application medium. A dye is a colorant, which is preferably soluble in the application medium.

Measuring Methods

Unless otherwise stated, the measurements carried out in the context of the invention were carried out at an ambient temperature of 23° C., an ambient air pressure 20 of 100 kPa (0.986 atm) and a relative atmospheric humidity of 50%.

Figure 2:
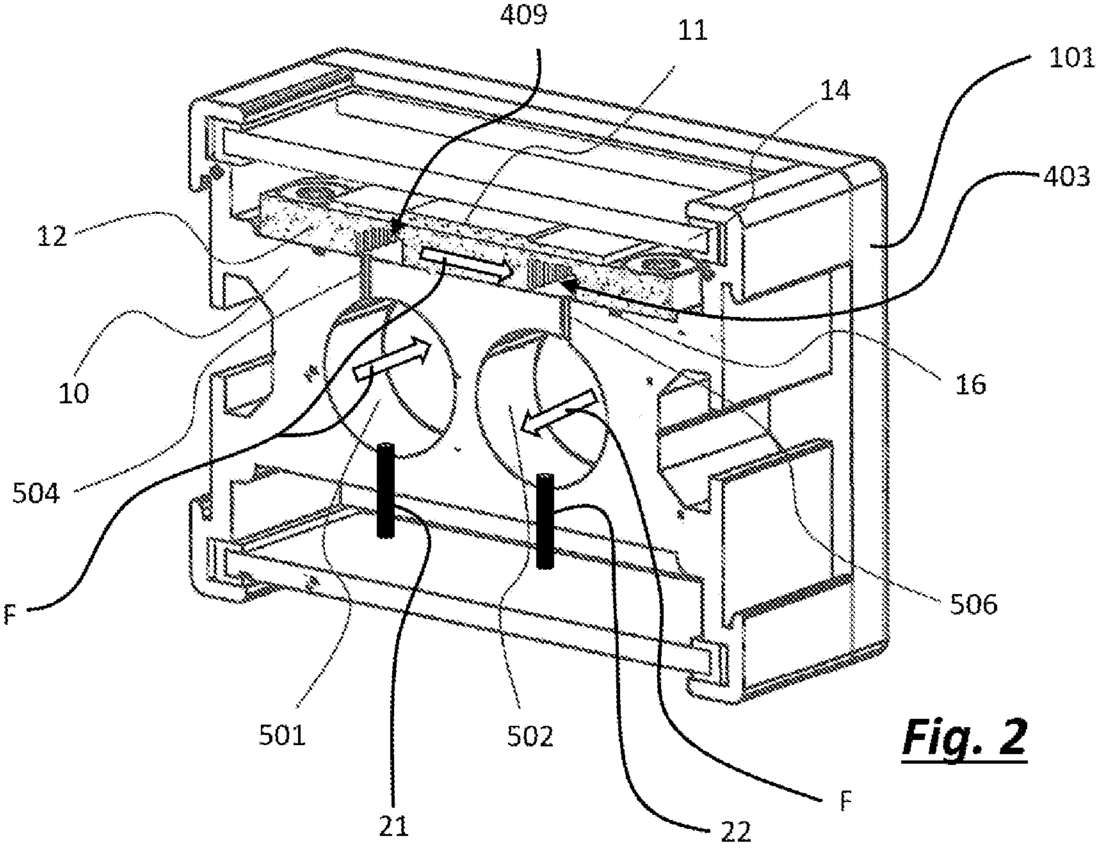
Figure 3:
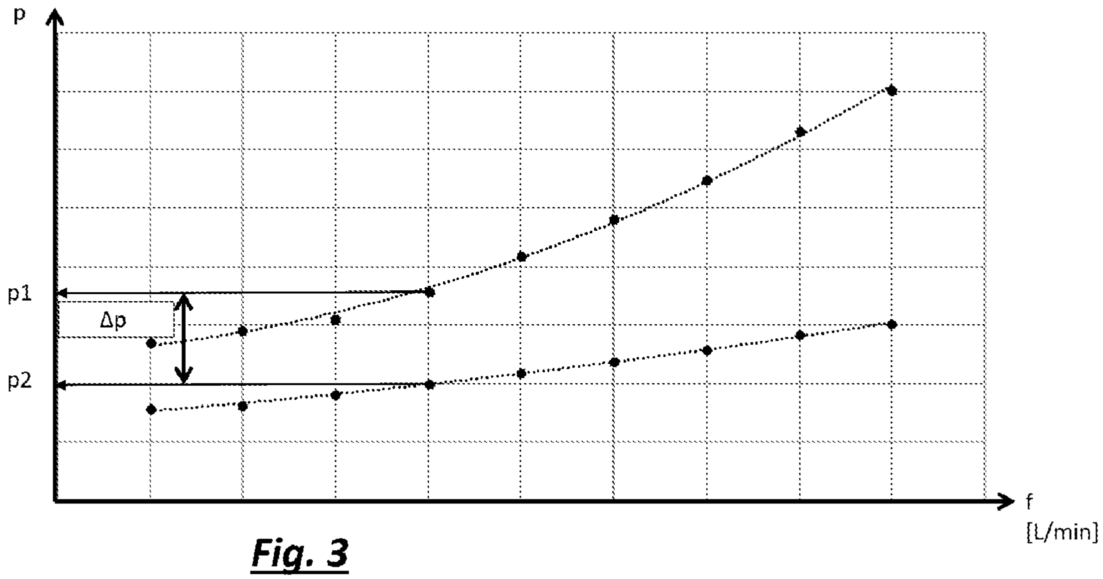

The invention is illustrated in more detail below by examples and drawings, wherein the examples and drawings do not limit the invention. Furthermore, unless otherwise indicated, the drawings are not true to scale. Preferred embodiments of the invention are given in the claims. Particular embodiments and aspects of the invention are described below with reference to the accompanying figures, in which are shown:

FIG. 1 an embodiment of a light source according to the invention;

FIG. 2 a perspective sectional view of an exemplary distributor block for a light source according to the invention; and FIG. 3 a schematic diagram of a first and a second cooling-fluid pressure as a function of the flow rate.

FIG. 1 shows a schematic representation of a light source 1 according to the invention. The light source 1 comprises an electronics unit which is connected to a first cooling-fluid pressure sensor 21 and a second cooling-fluid pressure sensor 22. The light source 1 further comprises a distributor block 10 with a cooling-fluid inlet opening 121 and a cooling-fluid return opening 122. Light-emitting components 11, 13, 15 are fastened to the distributor block. The light source 1 comprises a power electronics unit 7 for adjusting the light output of the light-emitting components 11, 13 and 15.

The light source 1 comprises a line system 103 through which the cooling fluid is conveyed in a flow direction F. The cooling fluid is conveyed by means of a flow control and/or regulation device 5 through the line system 103, which can comprise a pump 51 and optionally also a restrictor and/or a valve 53, such as a control valve or a balancing valve.

The first pressure sensor 21 can be arranged at the cooling-fluid inlet opening 121 of the distributor block 10. The second cooling-fluid pressure sensor 22 can be arranged at the cooling-fluid return opening 122 of the distributor block. The distributor block 10 is designed as a housing for receiving the light-emitting semiconductor components 11, 13, 15.

FIG. 2 shows a schematic partial representation of a section of the distributor block of a light source 1 according to the invention according to FIG. 1. In FIG. 2, a carrier element 12 is shown that carries one of the light-emitting components 11. The light-emitting component 11 is realized as an ultraviolet light-emitting semiconductor component, more precisely: an LED module. FIG. 2 shows just one first carrier element 12 with a single light-emitting component 11. Referring to FIG. 1, it is clear that a light source 1 can comprise a plurality of light-emitting components 11, 13, 15, wherein in particular each light-emitting component 11, 12, 13 can be fastened to the distributor block 10 by means of one carrier element 12 each. The first light-emitting semiconductor component 11, which is an LED module 11, is soldered onto the first carrier element 12. The first carrier element 12 can be screwed onto the distributor block 10 with, for example, two countersunk screws as fastening means. The first light-emitting semiconductor component 11, the first carrier element 12 and the distributor block 10 overlay one another in the aforementioned order. The LED module 11 contains a substrate made of a ceramic material onto which a plurality of LED chips is mounted, in particular in chip-on-board technology. The LED module 11 is a UV LED module. 28 carrier elements with 12 with one LED module 11, 13, 15 each are, for example, mounted next to one another on the distributor block 10 in the longitudinal direction thereof.

According to another example not shown, 16 carrier elements 12, each of which has a longitudinal width of 1" and carries one LED module 11, 13 or 15, can, for example, be mounted next to one another on the distributor block 10 in the longitudinal direction thereof. In this example, a desired flow rate of 16 L/min can be provided, wherein a pressure difference Δp of approximately 300 mbar is established between the first cooling-fluid pressure p1 (for example, 1.2 bar) measured at the first pressure sensor 21 and the second cooling-fluid pressure p2 (for example, 0.9 bar) measured at the second pressure sensor 22 (see FIG. 3). The diameter of the first channel 501 and/or of the second channel 502 can be 0.75 inches, for example. The diameter of the first branch channel 504 and/or of the second branch channel 506 can be 1.3 mm, for example.

The schematic cross-sectional representation shown in FIG. 2 of the distributor block 10 of a light source 1 according to the invention shows that the distributor block 10 contains a first cavity 501, which is designed as an inlet for the cooling fluid. The first cavity is formed as a first channel that passes through under each of the carrier elements 12. The distributor block 10 also contains a second cavity 502, which is designed as a return for the cooling fluid. The second cavity 502 is formed as a second channel which passes through under each of the carrier elements 12. A first fluid path 409 leads from the first cavity 501 to the second cavity 502. The cross-section of the first cavity 501 and the cross-section of the second cavity 502 are of equal size. In order to flow from the first cavity 501 to the second cavity 502, the cooling fluid must flow through one of the plurality of fluid paths 409 of the distributor block 10.

A fluid path 409 consists of three sections. The middle section is provided by the carrier body 12. The carrier body 12 comprises a plurality of heat-exchanger channels 403, which are formed below the light-emitting element 11 (or 13, 15) in the carrier body 13. A first branch channel 504 *r* leads from the first cavity 501 to the heat-exchanger channels 403. A further first branch channel (not shown), which leads from the first cavity 501 to the heat-exchanger channels 403 of the carrier element or carrier body 12, can also be provided in the distributor block 10. The first branch channel and optionally the further first branch channel form the first section of the fluid path 409.

From the second cavity 502, at least one second branch channel 506 leads to the heat-exchanger channels 403 of the carrier body 12. A further second branch channel (not shown in more detail) can lead from the second cavity 502 to the heat-exchanger channels 403. The at least one first branch channel 504 and the at least one second branch channel 506 are formed in the distributor block 10. The at least one first branch channel 504, the at least one second first branch channel 506 and the at least one heat-exchanger channel 403 together form the fluid paths 409.

The flow resistance or pressure loss between the first cooling-fluid pressure sensor 21 and the second cooling-fluid pressure sensor 22 is decisively determined by the hydraulic properties of the fluid path. The hydraulic properties of the fluid path 409 are decisively determined by the section with the smallest cross-section. The first section of the fluid path 409 is formed by the first branch channels 504; and the third section of the fluid path 409 is formed by the branch channels 506. The first branch channels 504 and the second branch channels 506 have substantially the same cross-section. The branch channels 504 and 506 decisively determine the hydraulic properties of the fluid path 409. The flow resistance or the pressure difference between the first cooling-fluid pressure sensor 21 the second cooling-fluid pressure sensor 22 is decisively determined by the flow resistance of the at least one first branch channel 504 and of the at least one second branch channel 506.

The heat-exchanger channels 403 in the carrier body 12 are bounded on the one hand by the carrier body 12 and on the other hand by an outer surface of the distributor block 10. A seal 16 is provided between the outer side of the distributor block 10 and the carrier body 12 in order to prevent a loss of cooling fluid. Alternatively, it is conceivable for the light-emitting components to be fastened directly to the distributor block 10 without a carrier body, the fluid path being realized in the distributor block 10 (not shown in detail). Alternatively, it is conceivable for heat-exchanger channels 403 to be formed in a carrier body 12 not bounded by a distributor block side. Such heat-exchanger channels would only be bounded by the carrier body 12 (not shown). The light-emitting components 11 can emit light to the surroundings through a protective window 14 which is held on the distributor block 10.

Starting from one end 101 of the distributor block 10, the light-emitting components 11, 13 and 15 can be divided into one or more proximal light-emitting components 11, one or more minute light-emitting components 13 and one or more distal light-emitting components 15. The various proximal (11), middle (13) and distal (15) light-emitting components can be adjusted independently of one another by means of the power electronics unit 7 of the electronics unit 3. For example, when the light source 1 is used in a printer for different format widths, the light-emitting components can be dimmed and/or deactivated in part, in particular in a location-dependent manner. For example, for a small format, it is possible for only the proximal light-emitting components 11 to be activated and for the middle and distal light-emitting components 13, 15 to be deactivated or dimmed. It is clear that the subdivision made into proximal, middle and distal light-emitting components 11, 13 and 15 is purely by way of example. In particular, the power electronics unit 7 can adjust the light output of each individual light-emitting component 11, 13 and/or 15 of a light source 1 independently of one another.

The pump 51 can be operated at its maximum nominal pump output, and the flow rate f can be set with the valve 53 to a desired flow rate, for example with a balancing valve as described in DE 20 2013 001 744 U1. In this way, it is possible to set the flow rate f which is required to ensure, at a predetermined cooling-fluid input temperature, the required cooling power for the temperature control of the light-emitting components 11, 13, 15 during operation during their operation at their respective maximum nominal output.

FIG. 3 schematically shows a diagram of measurements of the first pressure p1 and measurement of the second pressure p2. Since the second pressure p2 is measured downstream of the first pressure p1 in the flow direction F in the line system 103, the second pressure p2 is lower than the first pressure p1 as a result of the flow resistance between the first measuring point the second point. The difference between the first pressure p1 and the second pressure p2 is the pressure difference Δp. It is clear that the distributor block 10 and/or, if appropriate, the line system 103 could be flowed through in the reverse direction in particular in the case of a different pump configuration (not shown).

According to the diagram shown in FIG. 3, the pressure can be given as a pressure value in bar or pascal. It is conceivable for a pressure measurement value to be used as the pressure, for example in the form of a voltage signal or of a current signal, which is generated by the first cooling-fluid pressure sensor 21 or the second cooling-fluid pressure sensor 22. The pressure measurement value, i.e., the current value or the voltage value, preferably corresponds proportionally to the respective pressure value p1 or p2.

As shown in FIG. 3, the pressure p1 or p2 [bar] within the line system 103 is dependent on the flow rate f [L/min] of the cooling fluid through the line system 103. The pressure difference between the first pressure sensor 21 second pressure sensor 22 can be determined approximately by a formula known to the person skilled in the art for determining a pressure change along a straight pipe.

The electronics unit 3 is configured to detect whether the first pressure p1 and second pressure p2 captured by the sensors 21, 22 can permit a conclusion as to whether the light source 1 is functioning correctly or is malfunctioning.

If the pressure difference Δp approaches 0, it can be assumed that the volumetric flow rate is likewise approaching 0; or, in other words, the temperature of the light-emitting components 11, 13 and 15 is not being properly controlled. In this case, the electronics unit 3 can initiate an emergency shutdown of the light source 1. In the event of an emergency shutdown of the light source 1, the power electronics unit 7 can in particular first be caused to switch off the light output of the light-emitting components 11, 13 and 15.

The electronics unit 3 can in particular be configured to generate a diagnostic value, such as a status message, depending on the presence of a smallest required pressure difference Δp, wherein the power electronics unit 7 is configured to then operate the at least one light source 1 exclusively when the electronics unit 3 reports the presence of the lowest required pressure difference Δp. The lowest required pressure difference can correspond, for example, to 50 mbar, 100 mbar, 500 mbar or 1 bar. Otherwise, it can be assumed that no or no adequate cooling-fluid flow f is present to operate the at least one light source 1 without damage.

In normal operation of the light source 1, the electronics unit 3 can carry out a regulation on the basis of the first pressure p1 and the second pressure p2 or on the basis of electrical pressure measurement values corresponding to the first pressure or second pressure. If, for example, the pressure difference Δp decreases, this can indicate a reduced flow rate so that the electronics unit 3 can adjust the flow rate f by means of the flow control and/or regulation device 5, wherein, for example, the delivery rate of the pump 51 can be increased and/or a valve 53 can be opened wider.

If, during operation of the light source 1, the difference of the Δp between the first pressure p1 and the second pressure p2 or electrical pressure measurement values corresponding thereto increases in particular unexpectedly, the electronics unit 3 can, by means of the control or regulation device, adjust the flow rate f and/or output a diagnostic value, in particular a warning and/or error message.

In the case of a rapid increase in the difference Δp (e.g., a change by at least 0.5 bar in less than one minute), this can indicate a leakage or a significant blockage of the line system 103, for example of the first or second channel 501 or 502. The electronics unit 3 can be configured to adjust the flow rate f by means of the control or regulation device in the event of a rapid increase in the difference Δp, by, for example, reducing the delivery rate of the pump 51 and/or reducing the opening width of the valve 53.

In the case of a creeping increase in the difference Δp (e.g., a change by at least 0.5 bar within a period of at least one hour), this can indicate a partial and/or progressive closure of the line system 103, in particular of at least one fluid path 409. In the case of a creeping increase in the difference Δp, it can be assumed that, at the same delivery rate of the pump 51, the flow rate f decreases while the flow resistance and the associated difference Δp increases. The electronics unit 3 can be configured to adjust the flow rate f by means of the control or regulation device in the event of an in particular creeping increase in the difference Δp, by, for example, increasing the delivery rate of the pump 51 and/or increasing the opening width of the valve 53.

The electronics unit 3 can take into account, for example, a highest permissible maximum threshold value and/or a lowest permissible minimum threshold value in order to detect whether the pressure difference Δp is within a permissible range between the lowest permissible minimum threshold value and the highest permissible maximum threshold value. If the pressure difference of Δp is outside this permissible range, the electronics unit 3 can be configured to output a corresponding diagnostic value, control value and/or regulating value. Due to the structure of the light source 1, each of the carrier elements 12 of the light source 1 can be cooled in the method with a cooling power of approximately 300 W by means of a water-glycol mixture as cooling fluid, which flows, for example, at approximately 5 bar or approximately 1.5 bar within a cooling circuit 103, so that the two carrier elements 12 lying furthest away from one another in the longitudinal direction show a temperature difference of at most 4K. As a result, all LED modules 11, 13, 15 of the light source can be operated at approximately the same efficiency. As a result, a homogeneous irradiation and thus a homogeneous curing of the printing ink over a large area is possible, for example.

REFERENCE SIGNS

1 Light source
3 Electronics unit
5 Control and/or regulation device
7 Power electronics unit
10 Distributor block
11, 13, 15 Light-emitting component
12 Carrier body
14 Window
16 Seal
21 First pressure sensor
22 Second pressure sensor
51 Pump
53 Valve
103 Line system
121 Cooling-fluid inlet opening
122 Cooling-fluid return opening
403 Heat-exchanger channel
409 Fluid path
501 First cavity
502 Second cavity
504 First branch channel
506 Second branch channel
f Flow rate
F Flow direction
p1 First pressure
p2 Second pressure
Δp Pressure difference

The invention claimed is:

1. A light source comprising at least one light-emitting component and a cooling-fluid line system, through which a cooling fluid can flow in a flow direction, for controlling a temperature of the at least one light-emitting component, wherein a first cooling-fluid pressure sensor and a second cooling-fluid pressure sensor are arranged one after the other in the cooling-fluid line system in the flow direction; and an electronics unit is connected to the first cooling-fluid pressure sensor and the second cooling-fluid pressure sensor and is configured to determine at least one diagnostic, control and/or regulating value on the basis of pressures captured by the first cooling-fluid pressure sensor and by the second cooling-fluid pressure sensor, and wherein the cooling-fluid line system comprises a distributor block with a cooling-fluid inlet opening and a cooling-fluid return opening, wherein the distributor block comprises a first cavity and a further cavity, wherein the first cavity and the further cavity are fluidically connected to one another by at least one fluid path; wherein the first cooling-fluid pressure sensor is arranged in the first cavity and the second cooling-fluid pressure sensor is arranged in the further cavity, wherein the first cooling-fluid pressure sensor is arranged at the cooling-fluid inlet opening and/or the second cooling-fluid pressure sensor is arranged at the cooling-fluid return opening, and/or wherein, the first cooling-fluid pressure sensor is arranged at an end of the distributor block opposite the cooling-fluid inlet opening and/or the second cooling-fluid pressure sensor is arranged at the end of the distributor block opposite the cooling-fluid return opening.

2. The light source according to claim 1, wherein the first cooling-fluid pressure sensor and/or the second cooling-fluid pressure sensor captures a pressure measurement value of the cooling fluid and provides a corresponding electrical pressure measurement signal to the electronics unit, wherein the corresponding electrical pressure measurement signal is a proportional current or voltage signal.

3. The light source according to claim 1, wherein the electronics unit has a flow control and/or regulation device which is configured to define a flow rate of the cooling fluid in the flow direction through the cooling-fluid line system.

4. The light source of claim 1, wherein the at least one light-emitting component is a component emitting ultraviolet light and/or a semiconductor component.

5. A light source comprising at least one light-emitting component and a line system, through which a cooling fluid can flow in a flow direction, for controlling a temperature of the at least one light-emitting component, wherein a first cooling-fluid pressure sensor and a second cooling-fluid pressure sensor are arranged one after the other in the line system in the flow direction; and an electronics unit is connected to the first cooling-fluid pressure sensor and is second cooling-fluid pressure sensor and is configured to determine at least one diagnostic, control and/or regulating value on the basis of pressures captured by the first cooling-fluid pressure sensor and by the second cooling-fluid pressure sensor, wherein the electronics unit has a flow control and/or regulation device which is configured to define a flow rate of the cooling fluid in the flow direction through the line system, and wherein the flow control and/or regulation device has a pump with a delivery rate for conveying the cooling fluid through the line system, wherein the flow control and/or regulation device is configured to adjust the delivery rate of the pump taking into account a desired temperature control of the at least one light-emitting component for a lowest desired cooling-fluid flow rate, wherein the flow control and/or regulation device is configured to adjust the lowest desired cooling-fluid flow rate as a function of a diagnostic, control and/or regulating value of the electronics unit.

6. The light source according to claim 5, wherein the electronics unit comprises at least one power electronics unit for adjusting a light output of the at least one light-emitting component, wherein the electronics unit is configured to determine the diagnostic, control and/or regulating value on the basis of the light output and/or wherein the flow control and/or regulation device is configured to define the flow rate of the cooling fluid through the line system on the basis of the light output.

7. The light source of claim 5, wherein the at least one light-emitting component is a component emitting ultraviolet light and/or a semiconductor component.

* * * * *